United States Patent
VanDrunen et al.

(10) Patent No.: US 7,053,571 B1
(45) Date of Patent: May 30, 2006

(54) ELECTRIC MOTOR CONTROL CIRCUIT HAVING REDUCED ELECTROMAGNETIC INTERFERENCE EMISSIONS

(75) Inventors: Paul J. VanDrunen, Navarre, FL (US); Steven K. Maurer, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 11/096,319

(22) Filed: Mar. 31, 2005

(51) Int. Cl.
*H02P 1/00* (2006.01)

(52) U.S. Cl. .................. 318/280; 319/434; 319/138; 319/254; 319/439

(58) Field of Classification Search ............. 318/280, 318/434, 138, 254, 439, 630, 542, 433, 801, 318/800, 807; 180/65.2; 364/178
See application file for complete search history.

(56) References Cited

U.S. PATENT DOCUMENTS

| | | | | |
|---|---|---|---|---|
| 4,699,466 A | | 10/1987 | Brandstetter et al. .. | 350/162.12 |
| 5,072,358 A | * | 12/1991 | Lankford ..................... | 700/73 |
| 5,298,903 A | | 3/1994 | Janos ............................. | 342/4 |
| 5,586,613 A | * | 12/1996 | Ehsani ........................ | 180/65.2 |
| 6,326,751 B1 | | 12/2001 | Mullet et al. ............... | 318/434 |
| 6,366,766 B1 | | 4/2002 | Dalebroux .................. | 455/217 |
| 6,401,792 B1 | | 6/2002 | Mullet et al. ............... | 160/188 |
| 6,561,255 B1 | | 5/2003 | Mullet ......................... | 160/188 |
| 6,561,256 B1 | | 5/2003 | Mullet ......................... | 160/191 |
| 6,568,454 B1 | | 5/2003 | Mullet et al. ............... | 160/188 |
| 6,580,931 B1 | | 6/2003 | Shiotsu et al. .............. | 455/575 |

* cited by examiner

*Primary Examiner*—Karen Masih
(74) *Attorney, Agent, or Firm*—Renner Kenner Greive Bobak Taylor & Weber

(57) ABSTRACT

An electric motor control having reduced electromagnetic interference (EMI) emissions includes a motor controller, a switch, and a power converter. The motor controller upon receipt of a control signal causes the switch to toggle between two or more states. In one state the power converter produces a half-wave rectified output (50% power) and in another state produces full-wave rectified output (100% power). Thus, when an electric motor is connected to the output of the power converter, the motor's speed and other operating parameters can be controlled by motor controller by changing the state of the switch.

17 Claims, 1 Drawing Sheet

ELECTRIC MOTOR CONTROL CIRCUIT HAVING REDUCED ELECTROMAGNETIC INTERFERENCE EMISSIONS

TECHNICAL FIELD

Generally, the present invention relates to a control circuit for an electric motor. Specifically, the present invention relates to an electric motor control circuit that reduces conducted electromagnetic interference (EMI) emissions. Particularly, the present invention is directed to an electric motor control circuit that reduces conducted electromagnetic interference (EMI) emissions for a barrier operator which moves access barriers, such as a garage door.

BACKGROUND

Electronic control circuits are used in a wide variety of devices that use electric motors. The control circuit allows a user or system containing the electric motor to adjust various parameters of the power being supplied to the electric motor. As a result, the motor's operation can be controlled. For example, the speed of the electric motor can be adjusted by using the control circuit to limit the amount of current supplied to the motor. Furthermore, the control can be used to vary other aspect of the motor's operation, including but not limited to: rotational velocity, torque and direction of rotation.

Motor control circuits are of importance in barrier operators that are used to actuate access barriers, such as garage doors. However, these electronic motor control circuits are a source of unwanted conducted electromagnetic interference (EMI) emissions which are regulated by the Federal Communications Commission (FCC). Conducted electromagnetic interference (EMI) emissions, are radio frequency (RF) emissions between 150 kHz to 30 MHz which escape an electronic device through the device's electrical power cord. Because EMI emissions are limited by FCC compliance regulations, manufacturers must take affirmative steps to limit the amount of EMI emissions produced by their electronic products as a whole. To achieve EMI emission compliance, manufacturers utilize many techniques.

One method currently used to control a DC motor, while attempting to reduce EMI emissions, involves as a first step, full-wave rectifying the AC power supplied from a standard commercial power source, such as 120 VAC that is input to the motor control. Upon rectification, the AC power is converted into 120V pulsed DC power that is unregulated. To regulate the voltage, the 120V pulsed DC power is "chopped," using known techniques, so that the average DC voltage supplied to the DC motor can be controlled. Because the electric motor's speed is directly related to the voltage supplied to it, the motor is effectively controlled by adjusting the amount that the 120V pulsed DC power is "chopped." However, regulating the voltage supplied to the motor by "chopping" results in conducted EMI emissions that typically exceed FCC compliance regulations without appropriate EMI filtering. To overcome this problem, and reduce EMI emissions (as required per FCC regulations), many manufacturers resort to connecting large, bulky EMI filters to the motor control's circuitry. Because of the filter's large size, and the reduced amount of space often allocated for the design of a system or device incorporating the motor control, engineers are not able to achieve their design goals, which are necessary to keep a product's cost and size commensurate with consumer expectations. As a result, engineers must exhaust additional time and resources to develop an alternate design for the system, while sacrificing some of the functionality offered by the original design, in order to meet cost and design constraints. Additionally, the cost of the EMI filters are typically of a heightened expense as compared to the cost of the other components found in the motor control circuit. Furthermore, because the EMI filters add to the overall number of components of the control circuit, there is an elevated likelihood that the control circuit may fail, due to the additional processing and handling required to mount and connect the EMI filter and supporting components on the printed circuit board on which the motor control is mounted.

Therefore, there is a need for a motor control that eliminates or reduces the necessity for the EMI filter components, while still providing reduced EMI emissions. Additionally, there is a need for an electric motor control that controls an electric motor without "chopping" the voltage supplied to the motor, thus reducing EMI emissions. Furthermore, there is a need for an electric motor control that does not need an EMI filter, so that the overall number of components of the motor control can be reduced. Thereby improving the overall reliability of the motor control, while still retaining reduced EMI emissions.

DISCLOSURE OF INVENTION

It is thus a first aspect of the present invention to provide an electric motor control circuit having reduced electromagnetic interference emissions.

It is thus another aspect of the present invention to provide a low emission motor control circuit, comprising a motor receiving input power and generating output power; a power converter providing the input power to the motor; a motor controller; and a switch coupled to the power converter, the motor controller toggling the switch between two states applied to the power converter so as to adjust an amount of the input power provided to the motor.

It is yet another aspect of the present invention to provide a motor control circuit comprising a motor controller to detect the presence of a control signal; a switch connected to the motor controller, the switch responsively changing from a first state to a second state in response to the control signal, the switch further comprising a first mains power connection line; and a power converter connected to the switch, the power converter comprising a second mains power connection line, and a converter output line; whereby the power converter supplies a first level of power to the converter output line when the switch is in the first state, and the power converter supplies a second level of power to the converter output line when the switch is in the second state.

It is still another aspect of the present invention to provide a barrier operator to actuate an access barrier through linkage comprising an operator controller to control the operation of the barrier operator; a motor controller coupled to the operator controller to detect the presence of a control signal generated by the operator controller; a switch connected to the motor controller, the switch responsively changing from a first state to a second state in response to the control signal, the switch further having a first mains power connection line; a power converter connected to the switch, the power converter having a second mains power connection line, and a converter output line; and a motor connected to the converter output line, to move the access barrier between opened and closed positions using the linkage; wherein the power converter supplies a first level of power to the converter output line when the switch is in the first state, and the power converter supplies a second level of power to the converter output line when the switch is in the second state.

DESCRIPTION OF THE DRAWINGS

These and other features and advantages of the present invention will become better understood with regard to the following description, appended claims, and accompanying drawing wherein:

BEST MODE FOR CARRYING OUT THE INVENTION

Figure 1:
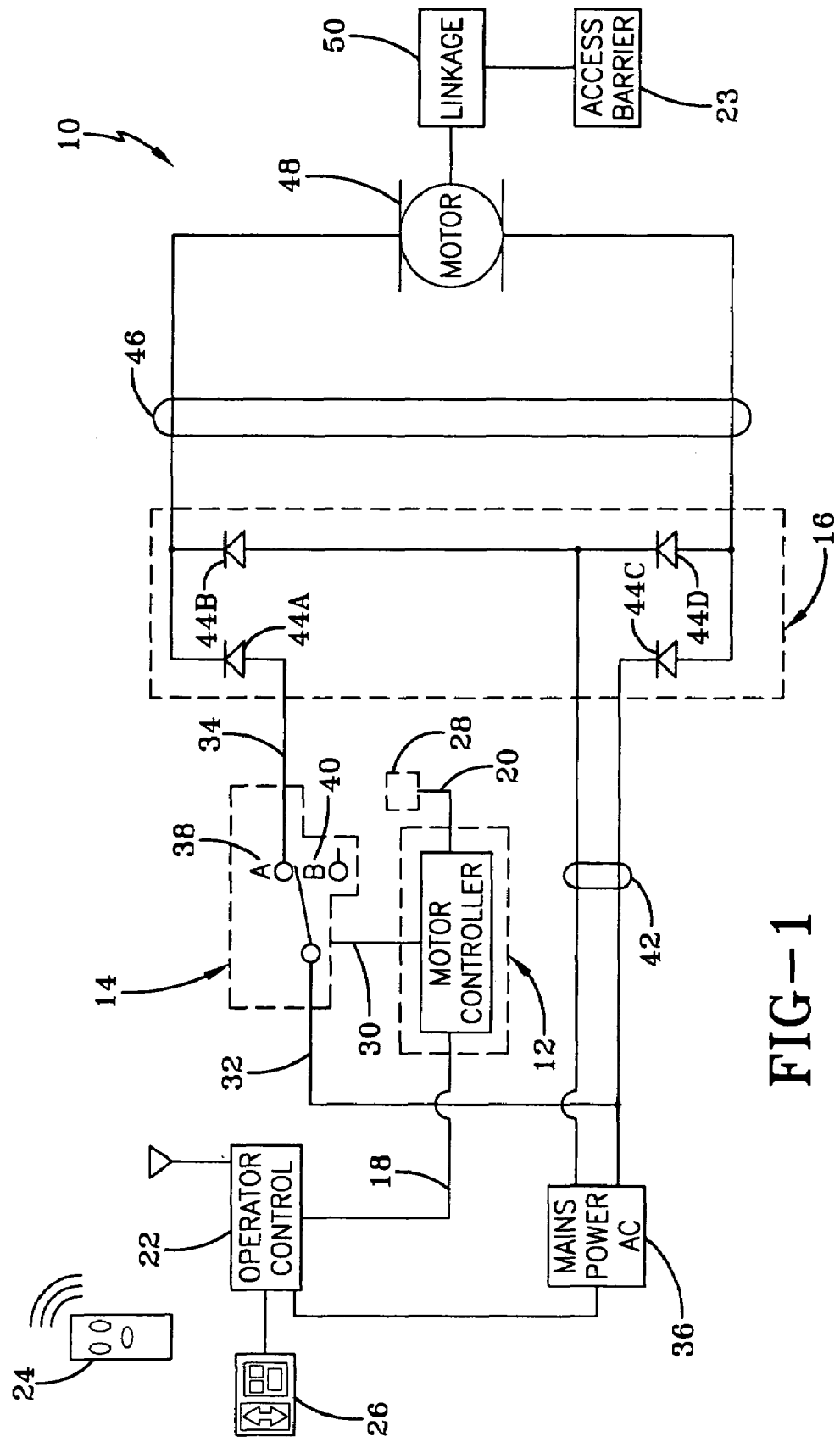
FIG. 1 is a schematic of a motor control circuit according to the present invention.

A system for controlling an electric motor having reduced electromagnetic interference emissions, or EMI emissions, is generally designated by the numeral 10 as shown in FIG. 1. While the present system 10 can be used as a motor control in various devices, the following discussion relates to the use of the motor control in a barrier operator. The barrier operator is typically used to move an access barrier, such as a garage door, between open and closed positions.

The motor control system 10 comprises a motor controller 12, a switch 14, and a power converter 16. The motor controller 12 is provided to coordinate the operation of the motor control system 10. Specifically, the motor controller 12 comprises a logic control that may be implemented using a general purpose, or application specific semiconductor based microprocessor/microcontroller that provides the necessary hardware, software, and memory to carry out the functions to be described. The motor controller 12 receives inputs from a control line 18 and a controller power line 20. An exemplary motor controller may be provided by Siemens, part number T7CV5D-24. Of course, other related components could be used.

An operator controller 22 is connected to the control line 18 and is a part of the barrier operator. As will be discussed in detail, the operator controller 22 sends control signals to the motor controller 12. The operator controller 22 comprises a logic control that may be implemented using a general purpose, or application specific semiconductor based microprocessor/microcontroller that provides the necessary hardware, software, and memory to carry out the functions provided. Generally, the operator controller 22 receives various input signals, and generates output signals, to carry out the functions associated with the barrier operator, such as the opening or closing of an access barrier 23. For example, a user may send a request to the operator controller 22, requesting that the access barrier 23 be opened or closed, using a remote transmitter 24 or a wireless or wired wall station transmitter 26. Accordingly, the operator controller 22 generates output signals to move the access barrier 23 in the requested manner. It will be appreciated that the operator controller 22 may be associated with other types of barriers such as curtains, gates, awnings and the like.

A controller power source 28 is connected to the motor controller via the controller power line 20. The power source 28 can be any type that is compatible for use with the motor controller 12, however a DC power supply of 5 volts is typically used. This may be supplied by a battery or stepped down from the operator's power source.

The motor controller 12 is connected to the switch 14 through an activation line 30. The switch 14 includes a switch input line 32, and a switch output line 34. The activation line 30, allows the motor controller 12 to control whether a mains power source 36, which is connected to the switch input line 32, is connected or disconnected to the switch output line 34. Briefly, in response to an activation signal sent by the motor controller 12, via the activation line 30, the switch 14 responsively changes states from a full power state 38 to a reduced power state 40. As used herein, the full power state refers to an application of 100% of the power available from the mains power to the motor and the reduced power state refers to application of about 50% power of the available power to the motor. Of course, other reduced power level values could be obtained with an appropriately selected power converter. In any event, the switch 14 toggles its operation, transitioning from the reduced state 40 to the full state 38, in response to another activation signal. When the switch 14 is in the full state 38, the switch input line 32 providing mains power 36 is connected to the switch output line 34. Alternatively, when the switch 14 is in the reduced state 40, the switch input line 32, providing mains power 36 is disconnected from the switch output line 34. Mains power as used herein, is defined as AC electrical power that is generally available on public commercial power lines, such as 120 VAC, at 60 Hz for example. It should also be appreciated that the switch 14 may be comprised of any suitable switching system that is capable of connecting and disconnecting the AC mains power source 36 from the switch output line 34, including but not limited to relays, transistors (FET, BJT), or silicon controlled rectifiers (SCR). Although the present system 10 is typically used with the mains power source 36, it is also contemplated that the present system 10 is capable of being readily adapted for use with non-standard power sources.

The power converter 16 is coupled to the switch 14 by the switch output line 34. The power converter 16 is also coupled to the mains power source 36 by a converter power line 42. The power converter 16 converts the AC power it receives from the mains power source 36, into either half or full-wave rectified pulsed DC power, depending on the state of the switch 14, which will be explained more fully later. Although various methods may be utilized to achieve the AC to DC power conversion provided by the power converter 16, including such methods as using separate full-wave and half-wave rectifiers, a bridge rectifier is typically used as shown in the drawing. The bridge rectifier is capable of converting AC power into either full or half-wave rectified, pulsed DC power depending on the bridge rectifier's configuration as determined by the state of the switch 14. The bridge rectifier typically comprises four diodes 44A, 44B, 44C, and 44D, arranged such that the anode and the cathode of diode 44A are connected to the switch 14 and to the cathode of diode 44B respectively. Connected to the anode of diode 44B is the cathode of diode 44D. Additionally, diode 44C is connected to the anode of diode 44D, while the cathode of diode 44C is connected to mains power supply 36. Furthermore, it should be appreciated that standard recovery diodes may be used for diodes 44A, 44B, 44C and 44D. Because the power converter 16 can supply either half or full-wave rectified pulsed DC power, the power converter 16 provides two levels of power to the load coupled to the power converter's output line 46, in this case, a motor 48 which has a rotatable shaft. Thus, the shaft's rotational velocity and other operating parameters can be adjusted by changing the amount of conversion (half or full) performed by the power converter 16. For example, when the power converter 16 is supplying half-wave rectified pulsed DC power, the motor 48 is supplied with 50% of the available power, and when the converter 16 is supplying full-wave rectified pulsed DC power, the motor 48 is supplied with 100% of the available power. Therefore, because the control system 10 is not "chopping" the power to control the motor 48, EMI emissions are substantially reduced. As a result, lower cost EMI filtering components may be used in order for the entire system 10 to pass FCC emissions.

The motor 48 is comprised of an electric motor that operates on DC power, which is suitable for actuating the access barrier 23, via linkage 50, between open and closed positions. The linkage 50 may be a counter-balancing system used to assist in moving the barrier between open and closed positions, or the linkage 50 may be part of a header-mounted, trolley type, screw drive, jackshaft or any other mechanism used to assist in moving the barrier.

Turning to the operation of the motor control system 10, where it is assumed that the switch 14 is initially in the full power state 38, the mains power 36 is supplied to the switch 14 by the switch input line 32, and is delivered to the diode 44A of the power converter 16 through the switch output line 34. Mains power 36 is also supplied to converter 16, via the converter power line 42. As a result of the mains power 36 being applied to both diode 44A and to the converter power line 42, the power converter 16 produces a full-wave rectified, pulsed DC output which is supplied on the converter output line 46 for the motor 48. Once the converter 14 powers the motor 48, the access barrier 23 is moved between opened and closed positions, via the linkage 50 as previously discussed.

Alternatively, if a control signal is sent from the operator controller 22 to the motor controller 12 on the control line 18, the motor controller 12 generates a corresponding activation signal. The activation signal is sent via the activation line 30 to the switch 14, thereby causing the switch 14 to toggle from the full power state 38, to the reduced power state 40, causing diode 44A to be effectively removed from the operation of the converter 16. As a result, the converter 16 produces a half-wave rectified, pulsed DC output for delivery to the converter output line 46, thus causing the access barrier 23 to be moved between opened and closed positions via the linkage 50. It should be appreciated that the motor controller 12 sends a corresponding activation signal to the switch 14, each time the motor controller 12 receives an appropriate control signal from the operator controller 22. As a result, the switch 14 is toggled from state 38 to state 40, and from state 40 to state 38. It will also be appreciated that the states may be toggled back and forth during movement of the barrier in the same direction. In other words, switching between states 38 and 40 is independent of door movement. And it is contemplated that the motor controller 12 may take into account other variables in determining whether to supply an activation signal to the switch 14. Some exemplary variables may include motor temperature, mains power failure, excessive power drain by the motor, position of the barrier safety considerations and the like.

It will, therefore, be appreciated that one advantage of one or more embodiments of the present system is that an electric motor control has reduced electromagnetic interference (EMI) emissions. Still another advantage of the present system is that a bulky, and expensive EMI filter is not required to reduce motor control EMI emissions when the motor control of the present system is used. Yet another advantage of the present invention is that the electric motor control of the present system is of a reduced size or dimension, and as a result, the cost of producing a device having a motor control is minimized. An additional advantage of the present system is that the overall reliability of the motor control, and associated electronics is increased due to the overall reduction of parts of the motor control and the corresponding reduction in handling and manufacturing steps needed to implement the motor control, and associated electronics as a whole.

Although the present invention has been described in considerable detail with reference to certain embodiments, other embodiments are possible. Therefore, the spirit and scope of the appended claims should not be limited to the description of the embodiments contained herein.

What is claimed is:

1. A low emission motor control circuit, comprising:
   a motor receiving input power and generating output power;
   a power converter providing rectified input power to said motor;
   a motor controller; and
   a switch coupled to said power converter, said motor controller toggling said switch between one or more states, wherein an amount of power rectification provided by said power converter is adjusted to a first level of rectification when said switch is in a first state, and adjusted to a second level of rectification when said switch is in a second state.

2. The low emission motor control circuit according to claim 1, wherein said motor operates on DC power.

3. The low emission motor control circuit according to claim 1, wherein said power converter comprises a bridge rectifier.

4. The low emission motor control circuit according to claim 1, wherein said power converter is comprised of separate half-wave and full-wave rectifiers.

5. The low emission motor control circuit according to claim 1, wherein said switch comprises a relay.

6. The low emission motor control circuit according to claim 1, wherein said switch comprises a transistor.

7. The low emission motor control circuit according to claim 1, wherein said switch comprises a silicon controlled rectifier.

8. A motor control circuit comprising:
   a motor controller to detect the presence of a control signal;
   a switch connected to said motor controller, said switch responsively changing from a first state to a second state in response to said control signal, said switch further comprising a first mains power connection line; and
   a power converter connected to said switch, said power converter having a second mains power connection line, and a converter output line;
   whereby said power converter supplies a first level of power to said converter output line when said switch is in said first state, and said power converter supplies a second level of power to said converter output line when said switch is in said second state.

9. The motor control circuit as set forth in claim 8, wherein said switch comprises a relay.

10. The motor control circuit as set forth in claim 8, wherein said switch comprises a transistor.

11. The motor control circuit as set forth in claim 8, wherein said switch comprises a silicon controlled rectifier.

12. The motor control circuit as set forth in claim 8, wherein said power converter comprises a bridge rectifier.

13. The motor control circuit as set forth in claim 8, wherein said power converter comprises separate half-wave and full-wave rectifiers.

14. A barrier operator to actuate an access barrier through linkage comprising:

an operator controller to control the operation of the barrier operator;

a motor controller coupled to said operator controller, to detect the presence of a control signal generated by said operator controller;

a switch connected to said motor controller, said switch responsively changing from a first state to a second state in response to said control signal, said switch further having a first mains power connection line;

a power converter connected to said switch, said power converter having a second mains power connection line, and a converter output line; and a motor connected to said converter output line, said motor adapted to move said access barrier between opened and closed positions using the linkage;

wherein said power converter supplies a first level of power to the converter output line when said switch is in said first state, and said power converter supplies a second level of power to said converter output line when said switch is in said second state.

15. The barrier operator according to claim 14, wherein said operator controller selectively generates said control signal based upon predetermined criteria.

16. The barrier operator according to claim 15, wherein said first state is about 100% power and said second state is somewhat less than said first state.

17. The barrier operator according to claim 16, wherein said second state is about 50% power.

* * * * *